(12) United States Patent
Huang et al.

(10) Patent No.: US 11,763,708 B2
(45) Date of Patent: Sep. 19, 2023

(54) METHOD FOR GENERATING IMAGE WITH UNIFORM BRIGHTNESS

(71) Applicant: Innolux Corporation, Miao-Li County (TW)

(72) Inventors: Yu-Chia Huang, Miao-Li County (TW); Tsung-Han Tsai, Miao-Li County (TW); Hsiu-Tung Lin, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/540,197

(22) Filed: Dec. 1, 2021

(65) Prior Publication Data
US 2022/0215782 A1 Jul. 7, 2022

(30) Foreign Application Priority Data
Jan. 4, 2021 (CN) .......................... 202110002798.3

(51) Int. Cl.
*G09G 3/00* (2006.01)
(52) U.S. Cl.
CPC ..... *G09G 3/002* (2013.01); *G09G 2320/0233* (2013.01); *G09G 2340/12* (2013.01)

(58) Field of Classification Search
CPC ........... G09G 3/002; G09G 2320/0233; G09G 2340/12; G09G 5/377; G09G 2320/0209; G06T 2207/10021; H04N 13/00; H04N 2013/0074
See application file for complete search history.

(56) References Cited

U.S. PATENT DOCUMENTS

| | | | |
|---|---|---|---|
| 7,339,625 B2* | 3/2008 | Matthys ................. | G03B 21/13 348/778 |
| 11,134,230 B2* | 9/2021 | Naganuma ............... | G09G 5/10 |
| 2014/0211168 A1* | 7/2014 | Yano .................... | H04N 9/3147 353/30 |
| 2017/0192733 A1* | 7/2017 | Huang .................. | G06F 3/1446 |

* cited by examiner

*Primary Examiner* — Antonio A Caschera
(74) *Attorney, Agent, or Firm* — JCIPRNET

(57) ABSTRACT

A method for generating an image with uniform brightness, the method includes: providing a first sub-image having a first overlapping portion and a first non-overlapping portion; providing a second sub-image having a second overlapping portion and a second non-overlapping portion; and superimposing the first sub-image with the second sub-image through the first overlapping portion and the second overlapping portion. The brightness of the first overlapping portion of the first sub-image is complementary to the brightness of the second overlapping portion of the second sub-image.

6 Claims, 7 Drawing Sheets

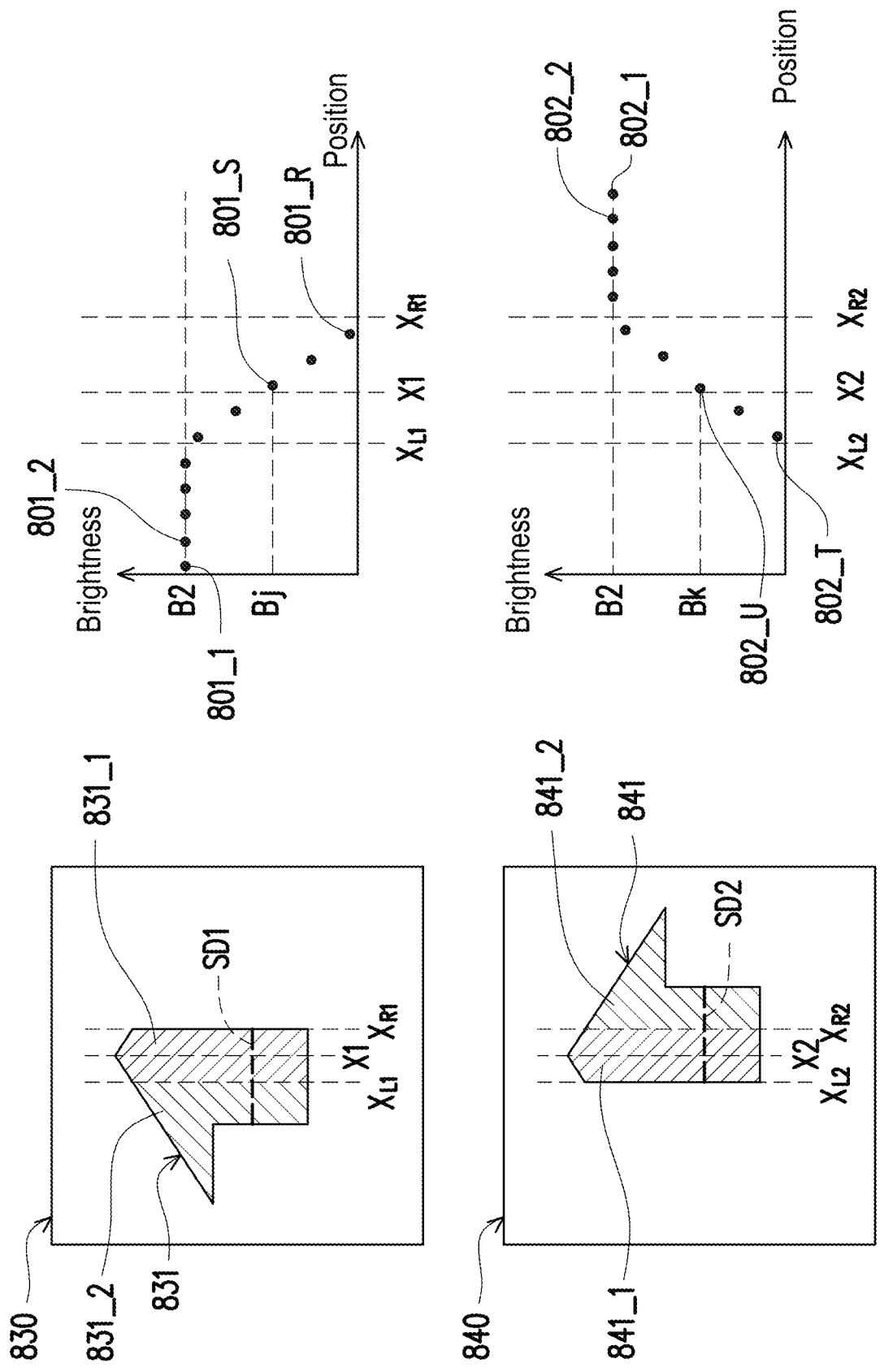

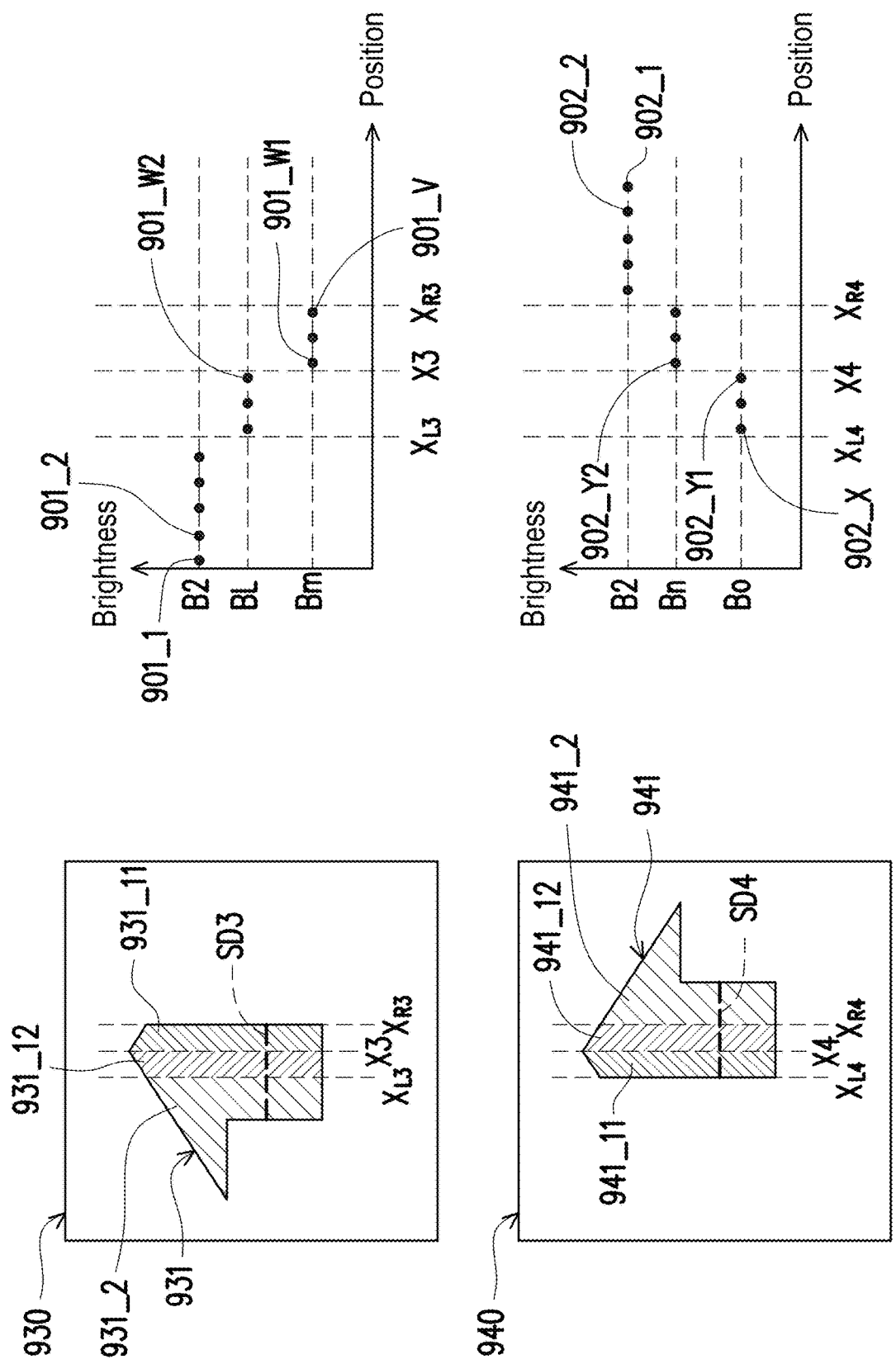

METHOD FOR GENERATING IMAGE WITH UNIFORM BRIGHTNESS

CROSS-REFERENCE TO RELATED APPLICATION

This application claims the priority benefit of China application serial no. 202110002798.3, filed on Jan. 4, 2021. The entirety of the above-mentioned patent application is hereby incorporated by reference herein and made a part of this specification.

BACKGROUND

Technical Field

The disclosure relates to an image generation method and particularly relates to a method for generating an image with uniform brightness.

Description of Related Art

Generally, to achieve an image display effect over a large projection area, the entire projection image needs to be formed by splicing multiple sub-images respectively projected from multiple projection devices, and the multiple sub-images are partially superimposed with each other. In such a case, however, if the overlapping portions of the multiple sub-images are not adjusted, the entire image may have excessively high or low brightness in the overlapping areas between the sub-images, which impairs the image display effect over a large area.

SUMMARY

The disclosure provides a method for generating an image with uniform brightness, applicable to displaying an image with uniform brightness on a projection surface.

According to an embodiment of the disclosure, a method for generating an image with uniform brightness includes: providing a first sub-image having a first overlapping portion and a first non-overlapping portion; providing a second sub-image having a second overlapping portion and a second non-overlapping portion; and superimposing the first sub-image with the second sub-image through the first overlapping portion and the second overlapping portion. Brightness of the first overlapping portion of the first sub-image is complementary to brightness of the second overlapping portion of the second sub-image.

Based on the above, the method for generating an image with uniform brightness according to the disclosure displays an image with uniform brightness by providing two images that are partially superimposed with each other.

The disclosure may be understood by referring to the following detailed description with reference to the accompanying drawings. It should be noted that, in order to facilitate the reader's understanding and the conciseness of the drawings, the drawings in the disclosure may only depict a part of a display device, and specific elements in the drawings may not be drawn according to actual scales. In addition, the number and size of each element in the drawings are only for illustration, and are not intended to limit the scope of the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8A and FIG. 8B are schematic diagrams of measurement of the brightness of sub-images according to another embodiment of the disclosure.

FIG. 9A and FIG. 9B are schematic diagrams of measurement of the brightness of sub-images according to yet another embodiment of the disclosure.

DETAILED DESCRIPTION OF DISCLOSED EMBODIMENTS

Figure 1A:
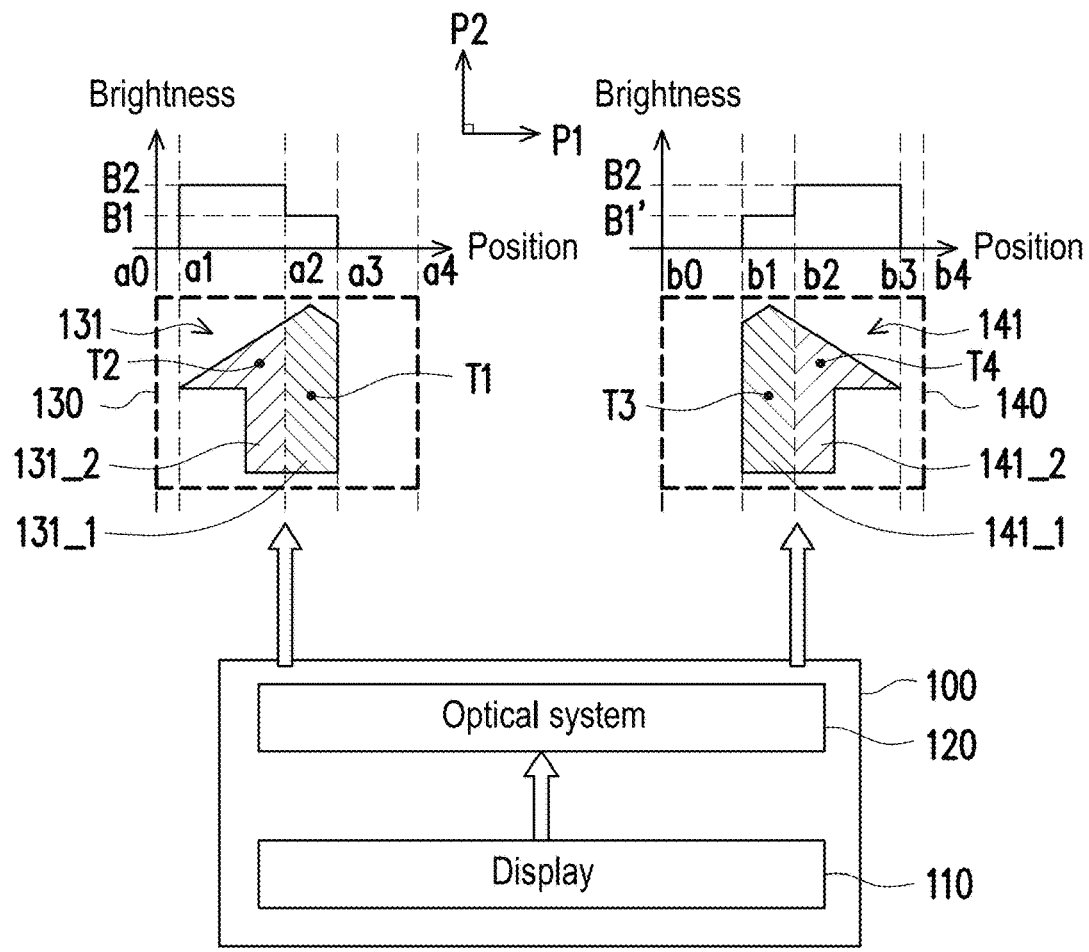
FIG. 1A is a schematic diagram of an electronic device and sub-images according to an embodiment of the disclosure.

Reference will now be made to the exemplary embodiments of the disclosure, and examples of the exemplary embodiments are illustrated in the accompanying drawings. Wherever possible, the same reference numerals are used in the drawings and description to indicate the same or similar parts.

It should be noted that, in order to facilitate the reader's understanding and the conciseness of the drawings, the drawings in the disclosure may only depict a part of an electronic device, and specific elements in the drawings may not be drawn according to actual scales. In addition, the number and size of each element in the drawings are only for illustration, and are not intended to limit the scope of the disclosure. For example, for clarity's sake, relative size, thickness and position of each film layer, region and/or structure may be reduced or enlarged.

Throughout the specification and claims of the disclosure, certain words are used to refer to specific elements. Those skilled in the art should understand that electronic device manufacturers may refer to the same elements by different names. This specification does not intend to distinguish those elements with the same function but different names. In the following description and claims, the words "have" and "include" are open-ended words, so they should be interpreted as "including but not limited to . . . "

The terms "about," "equal," "same," "substantially" or "approximately" mentioned herein generally represent falling within 10% of a given value or range, or represent falling within 5%, 3%, 2%, 1% or 0.5% of the given value or range. In addition, the terms "the given range is from a first value to a second value" and "the given range falls within the range of the first value to the second value" mean that the given range includes the first value, the second value and other values between the first value and the second value.

In some embodiments of the disclosure, the terms related to bonding and connecting mentioned in the specification, such as "connected," "interconnected," etc., unless specifically defined, may mean that two structures are directly in contact with each other, or that two structures are not directly in contact with each other but there are other structures located between the two structures. The terms related to bonding and connecting may also include a situation that both structures are movable or both structures are fixed. In addition, the terms "electrical connection" and "coupling" include any direct and indirect electrical connection means.

In the following embodiments, the same or similar elements may be denoted by the same or similar reference numerals, and descriptions thereof are omitted. In addition, the features in different embodiments may be combined arbitrarily as long as they do not violate the spirit of the disclosure or there is no confliction, and simple equivalent changes and modifications made in accordance with this specification or claims still fall within the scope of the disclosure. Moreover, the terms "first" and "second" mentioned in the specification or claims are only used to name different elements or to distinguish different embodiments or ranges, and are not intended to limit an upper limit or a lower limit of the number of the elements, and are not intended to limit a manufacturing sequence or an arrangement sequence of the elements.

It should be understood that the features in several different embodiments may be replaced, recombined or mixed, without departing from the spirit of the disclosure, to form other embodiments. The features in different embodiments may be combined arbitrarily as long as they do not violate the spirit of the disclosure or there is no confliction.

FIG. 1A is a schematic diagram of an electronic device and sub-images according to an embodiment of the disclosure. Referring to FIG. 1A, the electronic device 100 includes a display 110 and an optical system 120. The display 110 is coupled to the optical system 120. The electronic device 100 may project an image displayed by the display 110 to a projection surface through the optical system 120 for the projection surface to correspondingly display the display content of the display 110. The image of the disclosure includes, for example, an image, a pattern, a sign, text, a number, etc., but the disclosure is not limited thereto. In this embodiment, the electronic device 100 includes a head-up display (HUD), but not limited thereto. As shown in FIG. 1A, the optical system 120 may project a first sub-image 131 and a second sub-image 141 displayed by the display 110 to, for example, a windshield of a car for the windshield of the car to display the first sub-image 131 and the second sub-image 141. In this embodiment, the display 110 of the disclosure alternately displays the first sub-image 131 and the second sub-image 141 in a high-frequency switching manner. The high-frequency switching refers to that when human eyes watch the first sub-image 131 and the second sub-image 141 switched at a high frequency, the display switching speed of the first sub-image 131 and the second sub-image 141 creates persistence of vision for the eyes of the viewer, and as a result, the first sub-image 131 and the second sub-image 141 appear to be displayed simultaneously to the viewer, but the disclosure is not limited thereto. In another embodiment, the display 110 may generate the first sub-image 131 and the second sub-image 141 at the same time, and project the first sub-image 131 and the second sub-image 141 to the projection surface through the optical system 120.

In this embodiment, the display 110 may include, for example, a liquid crystal display, an organic light emitting diode (OLED) display, an inorganic light emitting diode (ILED) display, a Mini-LED display, a Micro-LED display, a quantum dot (QD) display, a quantum dot diode (QLED/QDLED) display, an electro-phoretic displays, etc., but the disclosure is not limited thereto. In this embodiment, the optical system 120 may include related optical elements and optomechanical elements for sequentially displaying the first sub-image 131 and the second sub-image 141 projected to different positions (but partially overlapping) of the projection surface, but the disclosure is not limited thereto. Moreover, the number of sub-images that the electronic device 100 of the disclosure switches to display is not limited to two as shown in FIG. 1A. The number of sub-images that the electronic device 100 switches to display may be determined according to different usage scenarios, equipment resources or user requirements. In addition, in some embodiments of the disclosure, the electronic device 100 may also include a plurality of displays and a plurality of optical systems for displaying sub-images individually (simultaneously or sequentially).

Figure 1B:
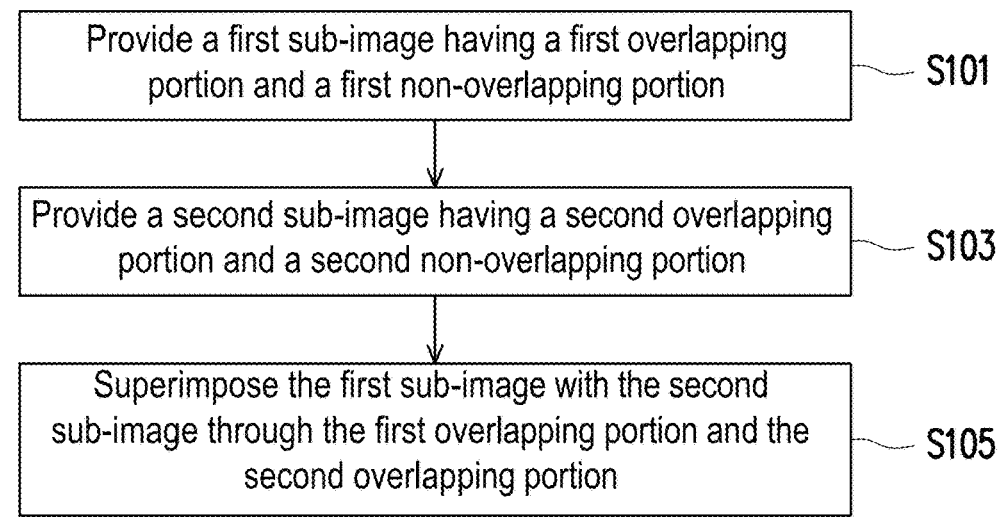
FIG. 1B is a flowchart of a method for generating an image with uniform brightness according to an embodiment of the disclosure.
Figure 2:
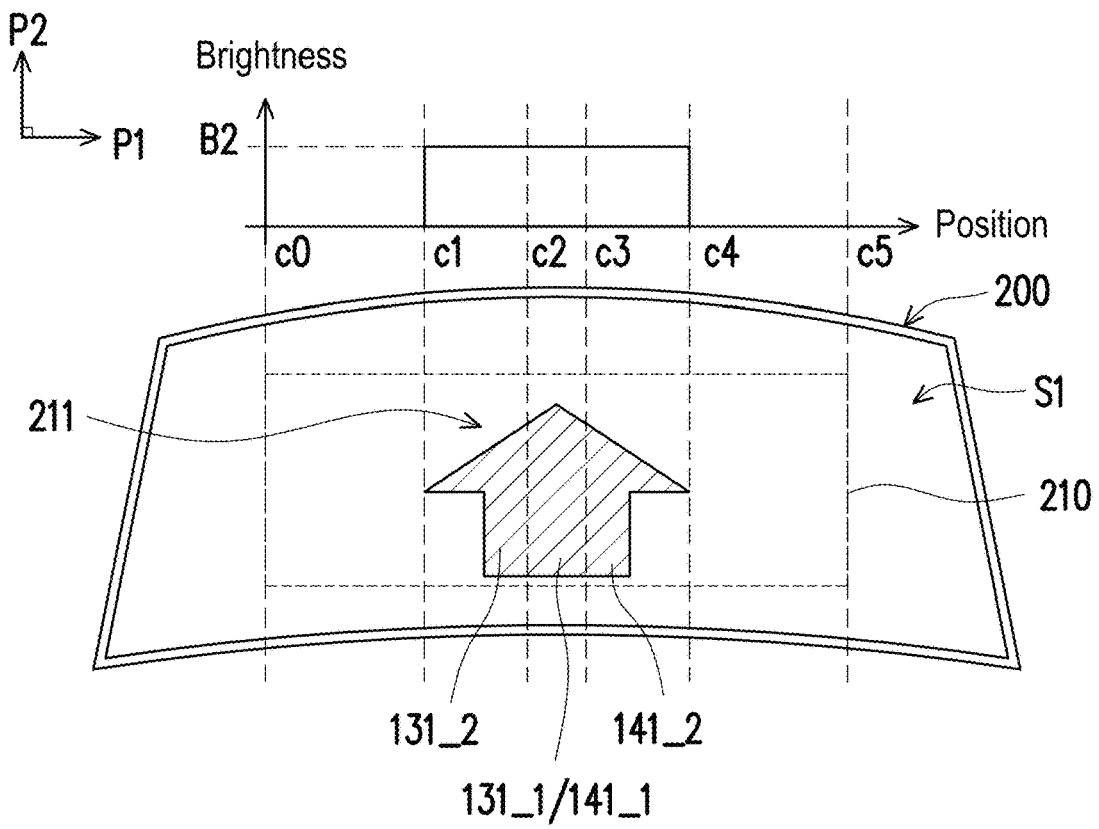
FIG. 2 is a schematic diagram of an image with uniform brightness according to an embodiment of the disclosure.

FIG. 1B is a flowchart of a method for generating an image with uniform brightness according to an embodiment of the disclosure. FIG. 2 is a schematic diagram of an image with uniform brightness according to an embodiment of the disclosure. Referring to FIG. 1A to FIG. 2, the electronic device 100 may perform the following steps S101, S103, and S105 to generate an image with uniform brightness. In step S101, the electronic device 100 may provide the first sub-image 131 having a first overlapping portion 131_1 and a first non-overlapping portion 131_2. As shown in FIG. 1A, the electronic device 100 may display the first sub-image 131 in a first display range 130. Two boundaries of the first display range 130 in the direction P1 are, for example, the position a0 and the position a4. In this embodiment, the range of the first overlapping portion 131_1 of the first sub-image 131 in the direction P1 is from the position a2 to the position a3. The range of the first non-overlapping portion 131_2 of the first sub-image 131 in the direction P1 is from the position a1 to the position a2. The first non-overlapping portion 131_2 of the first sub-image 131 may have a brightness value B2. The first non-overlapping portion 131_2 of the first sub-image 131 may have a distribution of brightness in a linear form, wherein the distribution of brightness may have a plurality of fixed values. In some embodiments, the plurality of fixed values are substantially the same. In other embodiments, any difference within plus or minus 10% between the fixed values is regarded as the fixed values referred to in the disclosure. As shown in FIG. 1A, the first overlapping portion 131_1 of the first sub-image 131 may have a brightness value B1. In this embodiment, the direction P1 is perpendicular to the direction P2. The direction P1 may be, for example, the horizontal direction of the projection plane, and the direction P2 may be, for example, the vertical direction of the projection plane.

In step S103, the electronic device 100 may provide the second sub-image 141 having a second overlapping portion 141_1 and a second non-overlapping portion 141_2. As shown in FIG. 1A, the electronic device 100 may display the second sub-image 141 in a second display range 140. Two boundaries of the second display range 140 in the direction P1 are, for example, the position b0 and the position b4. In this embodiment, the range of the second overlapping portion 141_1 of the second sub-image 141 in the direction P1 is from the position b1 to the position b2. The range of the second non-overlapping portion 141_2 of the second sub-image 141 in the direction P1 is from the position b2 to the position b3. The second non-overlapping portion 141_2 of the second sub-image 141 may have a brightness value B2, and the second non-overlapping portion 141_2 of the second sub-image 141 may have a distribution of brightness in a linear form, wherein the distribution of brightness may have a plurality of fixed values, and the plurality of fixed values are substantially the same. As shown in FIG. 1A, the first overlapping portion 141_1 of the second sub-image 141 may have a brightness value B1'.

In step S105, the electronic device 100 may superimpose the first sub-image 131 with the second sub-image 141 through the first overlapping portion 131_1 and the second overlapping portion 141_1. As shown in FIG. 1A, the range of the first display range 130 from the position a2 to the position a4 in the direction P1 may overlap the range of the second display range 140 from the position b0 to the position b2 in the direction P1. In this embodiment, the brightness value B1 of the first overlapping portion 131_1 of the first sub-image 131 is complementary to the brightness value B1' of the second overlapping portion 141_1 of the second sub-image 141. For example, the brightness value B1 and the brightness value B1' may each be half of the brightness value B2, or the sum of the brightness value B1 and the brightness value B1' may be substantially equal to the brightness value B2.

As shown in FIG. 1A and FIG. 2, the electronic device 100 may sequentially project the first sub-image 131 and the second sub-image 141 to a surface S1 of a projection target 200 (such as the windshield of a car or any projection surface), wherein the surface S1 may be a flat surface or a curved surface. In this regard, the viewer may see an image 211 as shown in FIG. 2. The image 211 is the result of partially superimposing the first sub-image 131 and the second sub-image 141. Two boundaries of the image range 210 of the image 211 in the direction P1 are the position c0 and the position c5. In this regard, the position c0 of the image range 210 corresponds to the position a0 of the first display range 130. The position c1 of the image range 210 corresponds to the position a1 of the first display range 130. The position c2 of the image range 210 corresponds to the position a2 of the first display range 130 and the position b1 of the second display range 140. The position c3 of the image range 210 corresponds to the position a3 of the first display range 130 and the position b2 of the second display range 140. The position c4 of the image range 210 corresponds to the position b3 of the second display range 140. The position c5 of the image range 210 corresponds to the position b4 of the second display range 140.

In this embodiment, the first overlapping portion 131_1 and the second overlapping portion 141_1 overlap, so that the first sub-image 131 and the second sub-image 141 form the image 211 with a larger image area. Moreover, since the brightness value B1 of the first overlapping portion 131_1 of the first sub-image 131 is complementary to the brightness value B1' of the second overlapping portion 141_1 of the second sub-image 141, the brightness of the image obtained by overlapping the first overlapping portion 131_1 and the second overlapping portion 141_1 is increased, and is substantially the same as the brightness of the first non-overlapping portion 131_2 and the brightness of the second non-overlapping portion 141_2. Therefore, the image 211 of this embodiment may present a display result with the uniform brightness value B2 from the position c1 to the position c4 in the direction P1. It should be noted that the "complementary" mentioned in the disclosure means that the sum of the brightness of the corresponding overlapping portions of the two sub-images is greater than the brightness before the addition. For example, referring to FIG. 1A and FIG. 2, the brightness value B2 obtained by overlapping the first overlapping portion 131_1 of the first sub-image 131 and the second overlapping portion 141_1 of the second sub-image 141 at the position c2 is greater than the brightness value B1 of the first overlapping portion 131_1 and the brightness value B1' of the second overlapping portion 141_1, and it may be said that the brightness value B1 of the first overlapping portion 131_1 is complementary to the brightness value B1' of the second overlapping portion 141_1.

It should be noted that the sub-images and image contents (or display pictures) of the images in the disclosure are not limited to FIG. 1A and FIG. 2. In addition, the term "uniform brightness" mentioned in each embodiment of the disclosure may include, for example, an image display result that an image has the same gray level in a pure color picture and the overall brightness distribution difference of the image is less than, for example, 10%, but the disclosure is not limited thereto. The term "uniform brightness" mentioned in each embodiment of the disclosure may also include, for example, an image display result that the range of the difference in the overall brightness distribution is not easily noticeable by human eyes or an image display result that the overall brightness value is consistent.

Figure 3:
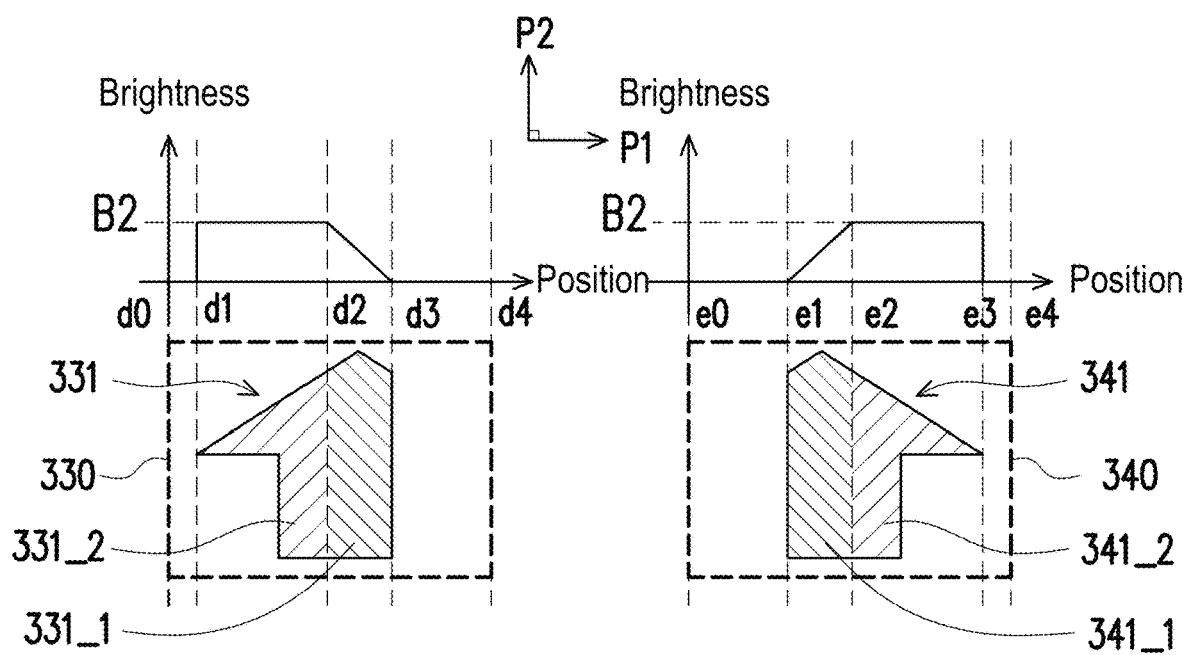
FIG. 3 is a schematic diagram of sub-images according to another embodiment of the disclosure.

FIG. 3 is a schematic diagram of sub-images according to another embodiment of the disclosure. Referring to FIG. 1A and FIG. 3, in some embodiments of the disclosure, the electronic device 100 of FIG. 1A may also provide the first display range 330 and the second display range 340 as shown in FIG. 3 to synthesize an image with uniform brightness. As shown in FIG. 3, in this embodiment, the electronic device 100 may provide the first sub-image 331 having the first overlapping portion 331_1 and the first non-overlapping portion 331_2. The electronic device 100 may display the sub-image 331 in the first display range 330. Two boundaries of the first display range 330 in the direction P1 are, for example, the position d0 and the position d4. In this embodiment, the range of the first overlapping portion 331_1 of the first sub-image 331 in the direction P1 is from the position d2 to the position d3. The range of the first non-overlapping portion 331_2 of the first sub-image 331 in the direction P1 is from the position d1 to the position d2. The first non-overlapping portion 331_2 of the first sub-image 331 may have the brightness value B2, and the first overlapping portion 331_1 of the first sub-image 331 may have a distribution of brightness in a linear form.

In this embodiment, the electronic device 100 may provide the second sub-image 341 having the second overlapping portion 341_1 and the second non-overlapping portion 341_2. The electronic device 100 may display the sub-image 341 in the second display range 340. Two boundaries of the second display range 340 in the direction P1 are, for example, the position e0 and the position e4. In this embodiment, the range of the second overlapping portion 341_1 of the second sub-image 341 in the direction P1 is from the position e1 to the position e2. The range of the second non-overlapping portion 341_2 of the second sub-image 341 in the direction P1 is from the position e2 to the position e3. The second non-overlapping portion 341_2 of the second sub-image 341 may have the brightness value B2, and the second overlapping portion 341_1 of the second sub-image 341 may have a distribution of brightness in a linear form.

In this embodiment, the electronic device 100 may superimpose the first sub-image 331 with the second sub-image 341 through the first overlapping portion 331_1 and the second overlapping portion 341_1. As shown in FIG. 3, the range of the first display range 330 from the position d2 to the position d4 in the direction P1 may overlap the range of the second display range 340 from the position e0 to the position e2 in the direction P1. In this embodiment, the brightness of the first overlapping portion 331_1 of the first sub-image 331 is complementary to the brightness of the second overlapping portion 341_1 of the second sub-image 341. For example, in terms of the relationship between the brightness and position of the image (coordinate axes), the first overlapping portion 331_1 of the first sub-image 331 may have a distribution of brightness in a linear form with a slope of −1, for example, and the second overlapping portion 341_1 of the second sub-image 341 may have a distribution of brightness in a linear form with a slope of 1, for example. Therefore, the electronic device 100 may sequentially or simultaneously project the first sub-image 331 and the second sub-image 341 to the surface S1 as shown in FIG. 2 for the viewer to see the image 211 with the uniform brightness value B2 as shown in the embodiment of FIG. 2.

Figure 4:
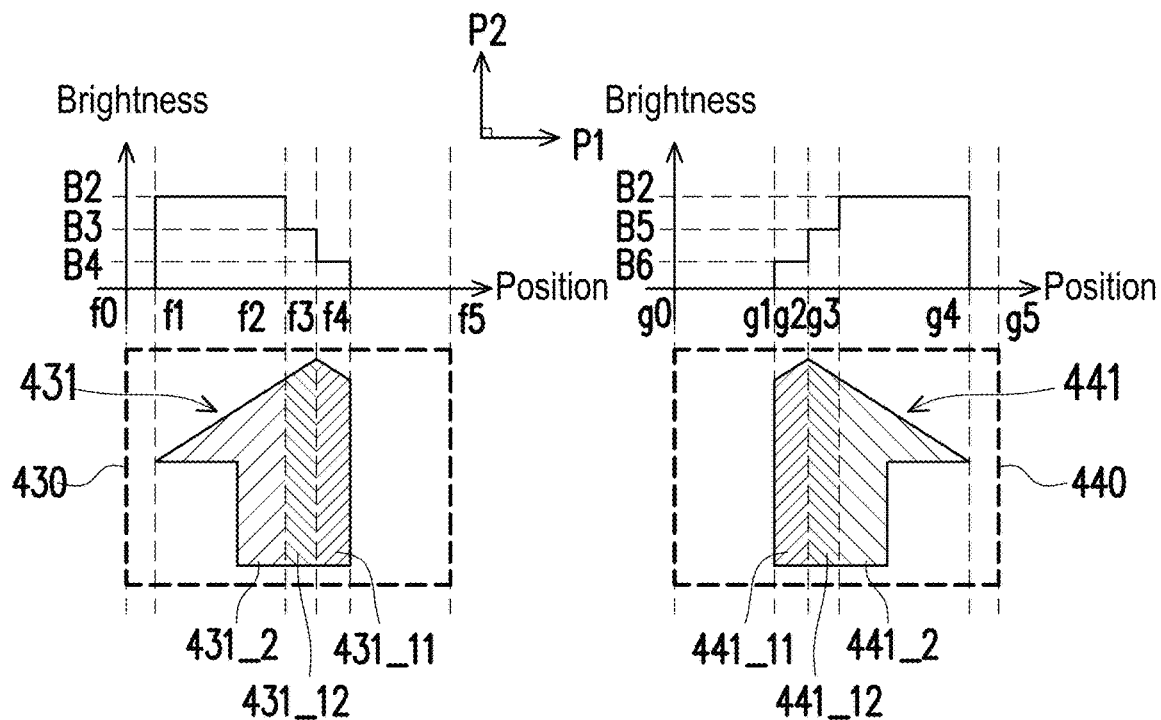
FIG. 4 is a schematic diagram of sub-images according to another embodiment of the disclosure.

FIG. 4 is a schematic diagram of sub-images according to another embodiment of the disclosure. Referring to FIG. 1A and FIG. 4, in some embodiments of the disclosure, the electronic device 100 of FIG. 1A may also provide the first display range 430 and the second display range 440 as shown in FIG. 4 to synthesize an image with uniform brightness. As shown in FIG. 4, in this embodiment, the electronic device 100 may provide the first sub-image 431 having the first overlapping portions 431_11 and 431_12 and the first non-overlapping portion 431_2. The electronic device 100 may display the sub-image 431 in the first display range 430. Two boundaries of the first display range 430 in the direction P1 are, for example, the position f0 and the position f5. In this embodiment, the range of the first overlapping portions 431_11 and 431_12 of the first sub-image 431 in the direction P1 is from the position f2 to the position f4. The range of the first non-overlapping portion 431_2 of the first sub-image 431 in the direction P1 is from the position f1 to the position f2. The first non-overlapping portion 431_2 of the first sub-image 431 may have the brightness value B2, and the first overlapping portions 431_11 and 431_12 of the first sub-image 431 may have a distribution of brightness in a stepped form. In this embodiment, the first overlapping portion 431_11 of the first sub-image 431 may have the brightness value B3 in the range from the position f2 to the position f3 in the direction P1, and the first overlapping portion 431_12 of the first sub-image 431 may have the brightness value B4 in the range from the position f3 to the position f4 in the direction P1.

In this embodiment, the electronic device 100 may provide the sub-image 441 having the second overlapping portions 441_11 and 441_12 and the second non-overlapping portion 441_2. The electronic device 100 may display the sub-image 441 in the second display range 440. Two boundaries of the second display range 440 in the direction P1 are, for example, the position g0 and the position g5. In this embodiment, the range of the second overlapping portions 441_11 and 441_12 of the second sub-image 441 in the direction P1 is from the position g1 to the position g3. The range of the second non-overlapping portion 441_2 of the second sub-image 441 in the direction P1 is from the position g3 to the position g4. The second non-overlapping portion 441_2 of the second sub-image 441 may have the brightness value B2, and the second overlapping portion 441_1 of the second sub-image 441 may have a distribution of brightness in a stepped form. In this embodiment, the second overlapping portion 441_12 of the second sub-image 441 may have the brightness value B5 in the range from the position g2 to the position g3 in the direction P1, and the second overlapping portion 441_11 of the second sub-image 441 may have the brightness value B6 in the range from the position g1 to the position g2 in the direction P1.

In this embodiment, the electronic device 100 may superimpose the first sub-image 431 with the second sub-image 441 through the first overlapping portions 431_11 and 431_12 and the second overlapping portions 441_11 and 441_12. As shown in FIG. 4, the range of the first display range 430 from the position f2 to the position f5 in the direction P1 may overlap the range of the second display range 440 from the position g0 to the position g3 in the direction P1. In this embodiment, the brightness value B4 of the first overlapping portion 431_11 of the first sub-image 431 is complementary to the brightness value B5 of the second overlapping portion 441_12 of the second sub-image 441. The brightness value B3 of the first overlapping portion 431_12 of the first sub-image 431 is complementary to the brightness value B6 of the second overlapping portion 441_11 of the second sub-image 441. For example, the sum of the brightness value B3 of the first overlapping portion 431_12 of the first sub-image 431 in the range from the position f2 to the position f3 in the direction P1 and the brightness value B6 of the second overlapping portion 441_11 of the second sub-image 441 in the range from the position g1 to the position g2 in the direction P1 is equal to the brightness value B2. The sum of the brightness value B4 of the first overlapping portion 431_11 of the first sub-image 431 in the range from the position f3 to the position f4 in the direction P1 and the brightness value B5 of the second overlapping portion 441_12 of the second sub-image 441 in the range from the position g2 to the position g3 in the direction P1 is equal to the brightness value B2. Therefore, the electronic device 100 may sequentially or simultaneously project the first sub-image 431 and the second sub-image 441 to the surface S1 as shown in FIG. 2 for the viewer to see the image 211 with the uniform brightness value B2 as shown in the embodiment of FIG. 2.

Figure 5:
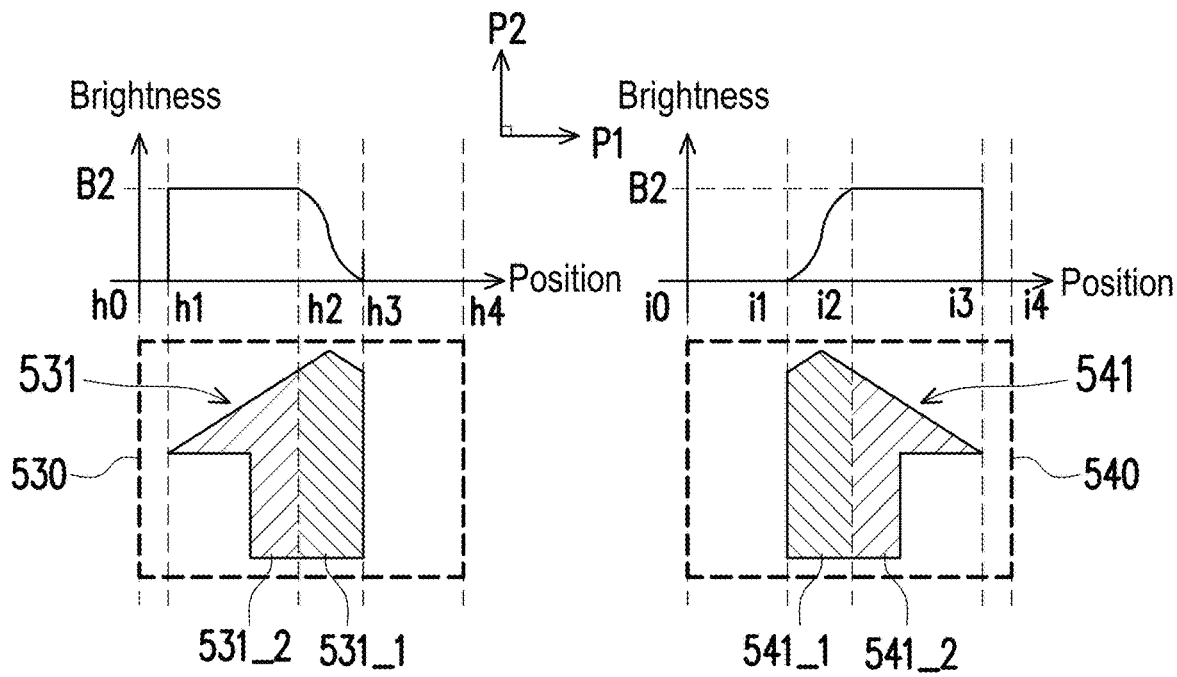
FIG. 5 is a schematic diagram of sub-images according to another embodiment of the disclosure.

FIG. 5 is a schematic diagram of sub-images according to another embodiment of the disclosure. Referring to FIG. 1A and FIG. 5, in some embodiments of the disclosure, the electronic device 100 of FIG. 1A may also provide the first display range 530 and the second display range 540 as shown in FIG. 5 to synthesize an image with uniform brightness. As shown in FIG. 5, in this embodiment, the electronic device 100 of FIG. 1A may display the sub-image 531 in the first display range 530 and provide the first sub-image 531 having the first overlapping portion 531_1 and the first non-overlapping portion 531_2. Two boundaries of the first display range 530 in the direction P1 are, for example, the position h0 and the position h4. In this embodiment, the range of the first overlapping portion 531_1 of the first sub-image 531 in the direction P1 is from the position h2 to the position h3. The range of the first non-overlapping portion 531_2 of the first sub-image 531 in the direction P1 is from the position h1 to the position h2. The first non-overlapping portion 531_2 of the first sub-image 531 may have the brightness value B2, and the first overlapping portion 531_1 of the first sub-image 531 may have a distribution of brightness in a non-linear form.

In this embodiment, the electronic device 100 may display the sub-image 541 in the second display range 540 and provide the sub-image 541 having the second overlapping portion 541_1 and the second non-overlapping portion 541_2. Two boundaries of the second display range 540 in the direction P1 are, for example, the position i0 and the position i4. In this embodiment, the range of the second overlapping portion 541_1 of the second sub-image 541 in the direction P1 is from the position i1 to the position i2. The range of the second non-overlapping portion 541_2 of the second sub-image 541 in the direction P1 is from the position i2 to the position i3. The second non-overlapping portion 541_2 of the second sub-image 541 may have the brightness value B2, and the second overlapping portion 541_1 of the second sub-image 541 may have a distribution of brightness in a non-linear form.

In this embodiment, the electronic device 100 may superimpose the first sub-image 531 with the second sub-image 541 through the first overlapping portion 531_1 and the second overlapping portion 541_1. As shown in FIG. 5, the range of the first display range 530 from the position h2 to the position h4 in the direction P1 may overlap the range of the second display range 540 from the position i0 to the position i2 in the direction P1. In this embodiment, the brightness of the first overlapping portion 531_1 of the first sub-image 531 is complementary to the brightness of the second overlapping portion 541_1 of the second sub-image 541. Therefore, the electronic device 100 may sequentially or simultaneously project the first sub-image 531 and the second sub-image 541 to the surface S1 as shown in FIG. 2 for the viewer to see the image 211 with the uniform brightness value B2 as shown in the embodiment of FIG. 2.

Referring to FIG. 1A again, which is taken as an illustration of proof, one proof method of the disclosure is that, for example, the tester may first shield the optical system 120 of the electronic device 100 from projecting the second sub-image 141, and capture the first sub-image 131 through an image capturing device (such as a charge-coupled device (CCD)) in an environment without external interference light. For the first captured image corresponding to the first sub-image 131 obtained by the image capturing device, the tester may arbitrarily measure the brightness value of one point (such as the measurement points T1 and T2) of the areas respectively corresponding to the first overlapping portion 131_1 and the first non-overlapping portion 131_2 in the first captured image. Then, the tester may shield the optical system 120 of the electronic device 100 from projecting the first sub-image 131, and capture the second sub-image 141 through the image capturing device in an environment without external interference light. For the second captured image corresponding to the second sub-image 141 obtained by the image capturing device, the tester may arbitrarily measure the brightness value of one point (such as the measurement points T3 and T4) of the areas respectively corresponding to the second overlapping portion 141_1 and the second non-overlapping portion 141_2 in the second captured image. Therefore, according to the obtained brightness value sensing results, the tester may determine whether the distribution of brightness meets the brightness distribution design of the embodiment of FIG. 1A of the disclosure for the first overlapping portion 131_1 and the first non-overlapping portion 131_2 of the first sub-image 131 and the second overlapping portion 141_1 and the second non-overlapping portion 141_2 of the second sub-image 141, which may effectively show whether to use the technique of the disclosure to realize the product. Moreover, such a proof method may also be applied to verify the technical solutions of the brightness distribution designs of the sub-images in the embodiments shown in FIG. 3 to FIG. 5.

Furthermore, another proof method of the disclosure may be that the tester operates the electronic device 100 to project a pure color picture instead of the special pattern shown in FIG. 1A. For example, the projected pure color picture may be a rectangle. For example, the tester may first shield the optical system 120 of the electronic device 100 from projecting the second pure color sub-image, and capture the first pure color sub-image through an image capturing device. For the first pure color captured image corresponding to the first pure color sub-image obtained by the image capturing device, the tester may arbitrarily measure multiple brightness values of multiple points of the areas respectively corresponding to the overlapping portion and the non-overlapping portion in the first pure color captured image, and obtain the average value of the multiple brightness values. Then, the tester may shield the optical system 120 of the electronic device 100 from projecting the first pure color sub-image, and capture the second pure color sub-image through the image capturing device. For the second pure color captured image corresponding to the second pure color sub-image obtained by the image capturing device, the tester may arbitrarily measure multiple brightness values of multiple points of the areas respectively corresponding to the overlapping portion and the non-overlapping portion in the second pure color captured image, and obtain the average value of the multiple brightness values. Therefore, according to the obtained average value sensing results, the tester may determine whether the distribution of brightness meets the brightness distribution design of the embodiment of FIG. 1A of the disclosure for the first overlapping portion 131_1 and the first non-overlapping portion 131_2 of the first sub-image 131 and the second overlapping portion 141_1 and the second non-overlapping portion 141_2 of the second sub-image 141, which may effectively show whether to use the technique of the disclosure to realize the product. Moreover, this proof method may also be applied to verify the technical solutions of the brightness distribution designs of the sub-images in the embodiments shown in FIG. 3 to FIG. 5.

Figure 6A:
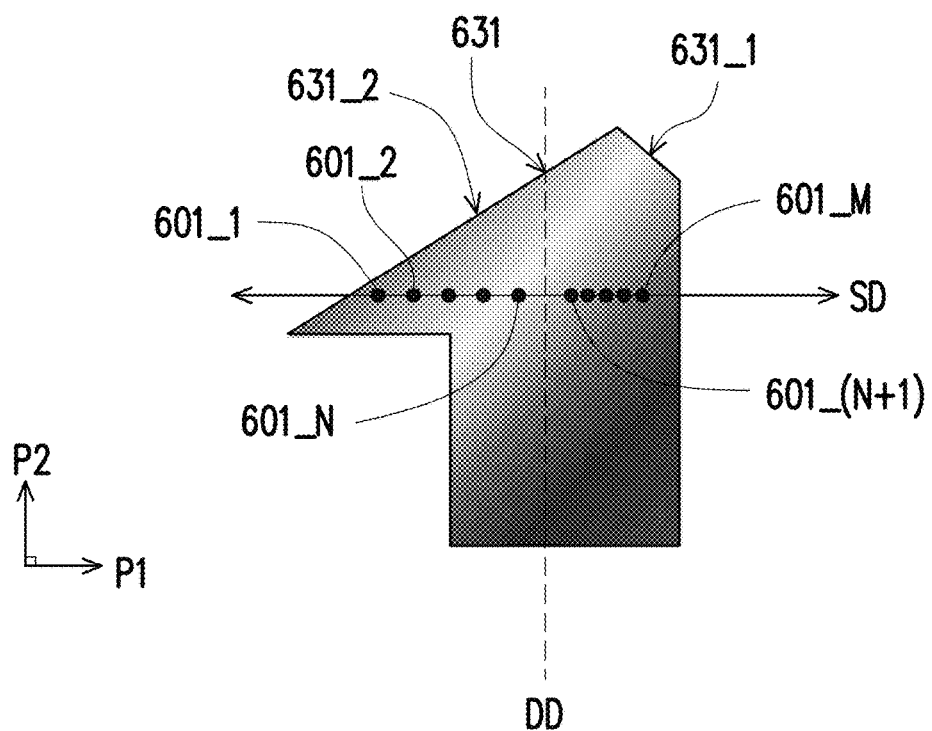
FIG. 6A to FIG. 6C are schematic diagrams of measurement of the brightness of sub-images according to an embodiment of the disclosure.
Figure 6B:
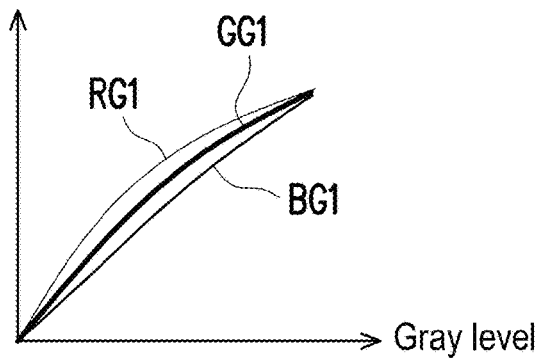
Figure 6C:
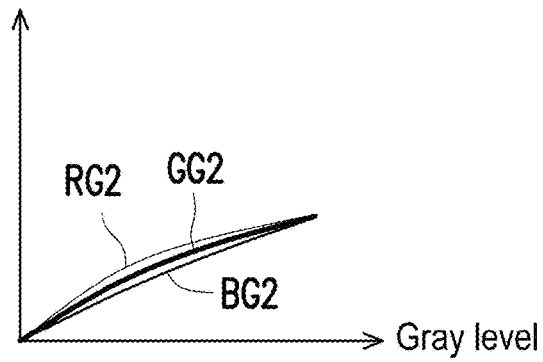

FIG. 6A to FIG. 6C are schematic diagrams of measurement of the brightness of sub-images according to an embodiment of the disclosure. Referring to FIG. 6A to FIG. 6C, another proof method of the disclosure may be that the tester operates the electronic device to project the first sub-image 631 with a color pattern as shown in FIG. 6A. For example, the tester may first shield the optical system of the electronic device from projecting the second sub-image, and capture the first sub-image 631 with the color pattern through an image capturing device in an environment without external interference light. For the first color captured image corresponding to the first sub-image 631 with the color pattern obtained by the image capturing device, the tester may perform brightness measurement on the areas respectively corresponding to the first overlapping portion 631_1 and the first non-overlapping portion 631_2 in the first color captured image according to multiple measurement points 601_1 to 601_M on the brightness measurement line SD (which may be substantially parallel to the image stitching direction, for example) to obtain multiple pieces of corresponding brightness information. In this regard, for example, the tester may perform brightness measurement at multiple equidistant measurement points 601_1 to 601_N in the first non-overlapping portion 631_2 along the brightness measurement line SD, and the tester may perform brightness measurement at multiple equidistant measurement points 601_(N+1) to 601_M in the first overlapping portion 631_1 along the brightness measurement line SD, wherein M is a positive integer. The measurement density of the first overlapping portion 631_1 may be higher than the measurement density of the first non-overlapping portion 631_2. In other words, the fixed distance between every two adjacent points of the measurement points 601_(N+1) to 601_M may be less than the fixed distance between every two adjacent points of the measurement points 601_1 to 601_N, but the disclosure is not limited thereto. In an embodiment, the fixed distance between every two adjacent points of the measurement points 601_(N+1) to 601_M may be greater than or equal to the fixed distance between every two adjacent points of the measurement points 601_1 to 601_N. In this regard, the tester may create the gamma curve of each color as shown in FIG. 6B according to the multiple pieces of brightness information of the measurement points 601_1 to 601_N of the first non-overlapping portion 631_2, wherein N is a positive integer. The gamma curve of each color may include, for example, the red gamma curve RG1, the green gamma curve GG1, and the blue gamma curve BG1, and the gamma curve represents the relationship between gray level and normalized brightness. Then, the tester may create the gamma curve of each color as shown in FIG. 6C according to the multiple pieces of brightness information of the measurement points 601_(N+1) to 601_M of the first overlapping portion 631_1. The gamma curve of each color may include, for example, the red gamma curve RG2, the green gamma curve GG2, and the blue gamma curve BG2. Accordingly, the tester may operate the electronic device to project the second sub-image with another color pattern, and obtain the gamma curve of each color of the overlapping portion and the non-overlapping portion as described above. In other words, the tester may determine whether the result of the gamma curve of each color of the color sub-image respectively in the overlapping portion and the non-overlapping portion has the difference as shown in FIG. 6B and FIG. 6C to effectively determine whether the distribution of brightness meets the brightness distribution design of one of FIG. 1A and FIG. 3 to FIG. 5 of the disclosure, which may effectively show whether to use the technique of the disclosure to realize the product.

In addition, the brightness measurement line SD used in this proof method is not limited to the form perpendicular to the image stitching line DD shown in FIG. 6A. In this regard, the proof method may use any measurement line, which may pass through the geometric center of the sub-image, for example, and the any measurement line may pass through the overlapping portion and the non-overlapping portion of each sub-image (such as the first sub-image 131 and the second sub-image 141 of FIG. 1A).

Figures 7A, 7B:
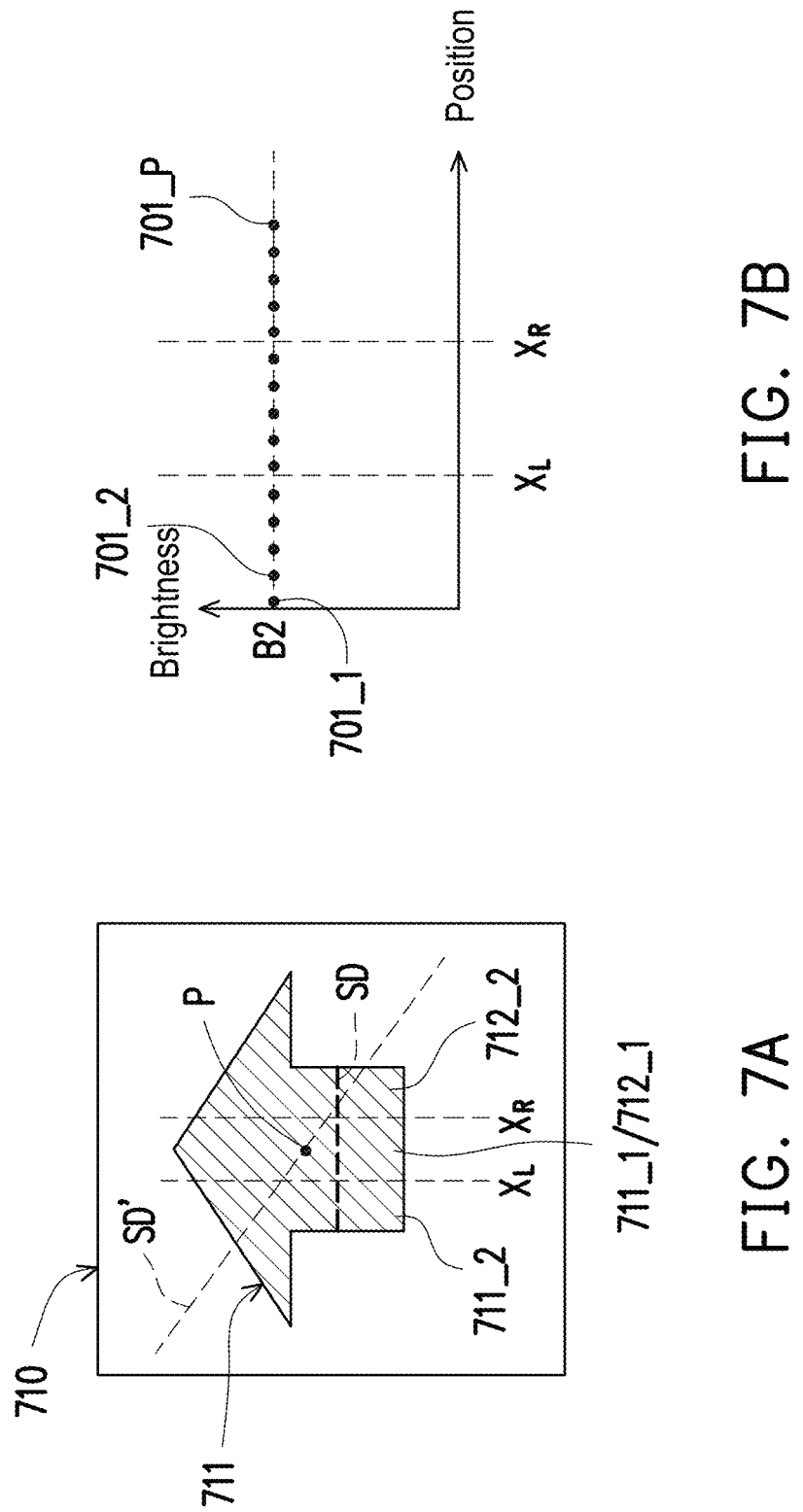
FIG. 7A and FIG. 7B are schematic diagrams of measurement of the brightness of an image according to an embodiment of the disclosure.

FIG. 7A and FIG. 7B are schematic diagrams of measurement of the brightness of an image according to an embodiment of the disclosure. Referring to FIG. 7A and FIG. 7B, another proof method of the disclosure may be that the tester captures the image range 210 as shown in FIG. 2 to obtain the captured image range 710 as shown in FIG. 7A. The tester may perform brightness measurement at multiple equidistant measurement points on the captured image 711 (corresponding to the image 211 of the image range 210) in the captured image range 710 along the brightness measurement line SD to obtain the brightness distribution result as shown in FIG. 7B. The brightness measurement line SD is perpendicular to the image stitching line $X_L$ and/or the image stitching line $X_R$. According to the relationship between brightness and position as shown in FIG. 7B, since the image 211 of FIG. 2 has uniform brightness, the brightness 701_1 to 701_P respectively outside the image stitching line $X_L$ and the image stitching line $X_R$ and between the image stitching line $X_L$ and the image stitching line $X_R$ may have substantially the same or similar brightness value B2 (the brightness distribution difference is less than 10%, for example). Accordingly, the tester may effectively prove that the image provided by the electronic device has an image display result with uniform brightness. It should be noted that the brightness measurement line SD is not limited to the form perpendicular to the image stitching line $X_L$ and/or the image stitching line $X_R$ shown in FIG. 7A. The proof method may use any measurement line, which may pass through the geometric center of the sub-image, for example, and the any measurement line may pass through the overlapping portion and the non-overlapping portion of each sub-image (such as the first sub-image 131 and the second sub-image 141 of FIG. 1A). For example, like the brightness measurement line SD' additionally marked in FIG. 7A, the brightness measurement line SD' may be an oblique straight line passing through the geometric center P of the captured image 711, and the brightness measurement line SD' passes through the first overlapping portion 711_1 of the first sub-captured image, the first non-overlapping portion 711_2 of the first sub-captured image, the second non-overlapping portion 712_2 of the second sub-captured image, and the first overlapping portion 712_1 of the second sub-captured image.

FIG. 8A and FIG. 8B are schematic diagrams of measurement of the brightness of sub-images according to another embodiment of the disclosure. Referring to FIG. 8A and FIG. 8B, the tester may first shield the optical system of the electronic device from projecting the second sub-image to capture the first sub-image, so as to obtain the first sub-captured image range 830 as shown in FIG. 8A. Then, the tester may shield the optical system of the electronic device from projecting the first sub-image to capture the second sub-image, so as to obtain the second sub-captured image range 840 as shown in FIG. 8A. The tester may perform brightness measurement at multiple equidistant measurement points on the first sub-captured image 831 in the first sub-captured image range 830 along the brightness measurement line SD1 to obtain the brightness distribution result of the brightness 801_1 to 801_R as shown in FIG. 8B, wherein R is a positive integer. The brightness measurement line SD1 is perpendicular to the image stitching line $X_{L1}$ and the image stitching line $X_{R1}$. The tester may perform brightness measurement at multiple equidistant measurement points on the second sub-captured image 841 in the second sub-captured image range 840 along the brightness measurement line SD2 to obtain the brightness distribution result of the brightness 802_1 to 802_T as shown in FIG. 8B, wherein T is a positive integer. The brightness measurement line SD2 is perpendicular to the image stitching line $X_{L2}$ and the image stitching line $X_{R2}$. It should be noted that the combined result of the first sub-captured image 831 and the second sub-captured image 841 is similar to the captured image 711 of FIG. 7A. The position of the image stitching line $X_{L1}$ in the image may correspondingly overlap the image stitching line $X_{L2}$, and the position of the image stitching line $X_{R1}$ in the image may correspondingly overlap the image stitching line $X_{R2}$.

In this embodiment, according to the brightness distribution result of the brightness 801_1 to 801_R, the tester may prove that one side of the first sub-captured image 831 along the image stitching line $X_{L1}$ has the first non-overlapping portion 831_2 with uniform brightness of the brightness value B2, and the first overlapping portion 831_1 having a distribution of brightness in a linear form is between the image stitching line $X_{L1}$ and the image stitching line $X_{R1}$. According to the brightness distribution result of the brightness 802_1 to 802_T, the tester may prove that one side of the second sub-captured image 841 along the image stitching line $X_{R2}$ has the second non-overlapping portion 841_2 with uniform brightness of the brightness value B2, and the second overlapping portion 841_1 having a distribution of brightness in a linear form is between the image stitching line $X_{L2}$ and the image stitching line $X_{R2}$. In addition, the tester may select the brightness 801_S corresponding to one point of the first overlapping portions 831_1 among the brightness 801_1 to 801_R from the reference position X1, and the tester may select the brightness 802_U corresponding to one point of the second overlapping portion 841_1 among the brightness 802_1 to 802_T from the reference position X2, wherein S and U are positive integers. The position of the reference position X1 in the image may correspondingly overlap the reference position X2. Therefore, the tester may add the brightness value Bj of the brightness 801_S to the brightness value Bk of the brightness 802_U. If the sum of the brightness value Bj and the brightness value Bk is substantially equal to the brightness value B2, it means that the electronic device of this test adopts the technique of the brightness distribution design of the sub-images in FIG. 3 of the disclosure to achieve the display effect of providing an image with uniform brightness.

However, this proof method is not limited to proving the brightness distribution design of the sub-images in the embodiment of FIG. 3 of the disclosure. If a brightness measurement technique the same as this proof method is applied to each sub-image in the embodiment of FIG. 5 of the disclosure to obtain the brightness distribution result of each sub-image, it may also show whether the electronic device to be tested adopts the brightness distribution design of the sub-images in the embodiment of FIG. 5 of the disclosure.

FIG. 9A and FIG. 9B are schematic diagrams of measurement of the brightness of sub-images according to yet another embodiment of the disclosure. The tester may first shield the optical system of the electronic device from projecting the second sub-image to capture the first sub-image, so as to obtain the first sub-captured image range 930 as shown in FIG. 9A. Then, the tester may shield the optical system of the electronic device from projecting the first sub-image to capture the second sub-image, so as to obtain the second sub-captured image range 940 as shown in FIG. 9A. The tester may perform brightness measurement at multiple equidistant measurement points on the first sub-captured image 931 in the first sub-captured image range 930 along the brightness measurement line SD3 to obtain the brightness distribution result of the brightness 901_1 to 901_V as shown in FIG. 9B, wherein V is a positive integer. The brightness measurement line SD3 is perpendicular to the image stitching line $X_{L3}$ and the image stitching line $X_{R3}$. The tester may perform brightness measurement at multiple equidistant measurement points on the second sub-captured image 941 in the second sub-captured image range 940 along the brightness measurement line SD4 to obtain the brightness distribution result of the brightness 902_1 to 902_X as shown in FIG. 9B, wherein X is a positive integer. The brightness measurement line SD4 is perpendicular to the image stitching line $X_{L4}$ and the image stitching line $X_{R4}$. It should be noted that the combined result of the first sub-captured image 931 and the second sub-captured image 941 is similar to the captured image 711 of FIG. 7A. The position of the image stitching line $X_{L3}$ in the image may correspondingly overlap the image stitching line $X_{L4}$, and the position of the image stitching line $X_{R3}$ in the image may correspondingly overlap the image stitching line $X_{R4}$.

In this embodiment, according to the brightness distribution result of the brightness 901_1 to 901_V, the tester may prove that one side of the first sub-captured image 931 along the image stitching line $X_{L3}$ has the first non-overlapping portion 931_2 with uniform brightness of the brightness value B2. The first sub-captured image 931 has the first overlapping portion 931_11 with uniform brightness of the brightness value Bm between the image stitching line $X_{R3}$ and the reference position X3, and the first overlapping portion 931_12 with uniform brightness of the brightness value BL between the image stitching line $X_{L3}$ and the reference position X3. According to the brightness distribution result of the brightness 902_1 to 902_X, the tester may prove that one side of the second sub-captured image 941 along the image stitching line $X_{R4}$ has the second non-overlapping portion 941_2 with uniform brightness of the brightness value B2. The second overlapping portion 941_11 with uniform brightness of the brightness value Bo is between the image stitching line $X_{L4}$ and the reference position X4, and the second overlapping portion 941_12 with uniform brightness of the brightness value Bn is between the image stitching line $X_{R4}$ and the reference position X4. In other words, since each overlapping portion of the first sub-image and the second sub-image has a distribution of brightness in a stepped form, the tester may obtain that the brightness distribution result of the respective pattern overlapping portions in the first sub-image and the second sub-image may be a distribution of brightness in a stepped form that has a sharp change in brightness. It should be noted that the "distribution of brightness in a stepped form" mentioned in the disclosure may mean that the brightness difference between two adjacent points among multiple measurement points measured at equal intervals changes sharply. For example, in FIG. 9B, the brightness value BL of the brightness 901_W2 changes to the brightness value Bm of the next brightness 901_W1.

In this embodiment, the tester may select the brightness 901_W1 corresponding to one point of the first overlapping portion 931_11 among the brightness 901_1 to 901_V between the reference position X3 and the image stitching line $X_{R3}$, and the tester may select the brightness 901_W2 corresponding to one point of the first overlapping portion 931_12 among the brightness 901_1 to 901_V between the reference position X3 and the image stitching line $X_{L3}$, wherein W1 and W2 are positive integers. The tester may select the brightness 902_Y1 corresponding to one point of the second overlapping portion 941_11 among the brightness 902_1 to 902_X between the reference position X4 and the image stitching line $X_{L4}$, and the tester may select the brightness 902_Y2 corresponding to one point of the second overlapping portion 941_12 among the brightness 902_1 to 902_X between the reference position X4 and the image stitching line $X_{R4}$, wherein Y1 and Y2 are positive integers. The position of the reference position X3 in the image may correspondingly overlap the reference position X4. Therefore, the tester may add the brightness value Bm of the brightness 901_W1 to the brightness value Bn of the brightness 902_Y2, and may add the brightness value BL of the brightness 901_W2 to the brightness value Bo of the brightness 902_Y1. If the sum of the brightness value Bm and the brightness value Bn is equal to the brightness value B2 (the error is within plus or minus 10%), and the sum of the brightness value BL and the brightness value Bo is equal to the brightness value B2 (the error is within plus or minus 10%), it means that the electronic device to be tested adopts the technique of the brightness distribution design of the sub-images in FIG. 4 of the disclosure to achieve the display effect of providing an image with uniform brightness.

In addition, it should be noted that the above proof methods are not limited to proving the specific embodiments of the disclosure. In the process of proving the electronic device to be tested, the tester may preferably adopt any of the proof methods that can be clearly verified and meet the corresponding conditions.

In summary, the electronic device and the method for generating an image with uniform brightness according to the disclosure may display an image with a larger image area on the projection surface by splicing and projecting multiple sub-images, and with the special brightness distribution design for the overlapping portions of the multiple sub-images, the image generated by partially overlapping the multiple sub-images may have an image display effect of uniform brightness.

It should be noted that the above embodiments are used to illustrate, not to limit, the disclosure. Although the disclosure has been described in detail with reference to the foregoing embodiments, those of ordinary skill in the art should understand that it is possible to make modifications to the foregoing embodiments, or equivalently replace some or all of the technical features. These modifications or replacements do not cause the essence of the corresponding technical solutions to deviate from the scope of the technical solutions of the embodiments of the disclosure.

What is claimed is:

1. A method for generating an image with uniform brightness, comprising:
    projecting, by an optical system, a first sub-image having a first overlapping portion and a first non-overlapping portion in a first display range;
    projecting, by the optical system, a second sub-image having a second overlapping portion and a second non-overlapping portion in a second display range; and
    superimposing, by the optical system, the first sub-image with the second sub-image through the first overlapping portion and the second overlapping portion,
    wherein brightness of the first overlapping portion of the first sub-image is complementary to brightness of the second overlapping portion of the second sub-image,
    wherein the first display range comprises first, second, third and fourth regions sequentially arranged along a first direction, and two boundaries of the first display range in the first direction are the first region and the fourth region,
    wherein the first non-overlapping portion of the first sub-image is projected in the second region,
    wherein the first overlapping portion of the first sub-image is projected in the third region,
    wherein the first overlapping portion of the first sub-image has a first brightness value,
    wherein the first non-overlapping portion of the first sub-image has a second brightness value,
    wherein the second display range comprises fifth, sixth, seventh and eighth region sequentially arranged along the first direction, and two boundaries of the second display range in the first direction are the fifth region and the eighth region,
    wherein the second non-overlapping portion of the second sub-image is projected in the seventh region,
    wherein the second overlapping portion of the second sub-image is projected in the sixth region,
    wherein the second overlapping portion of the second sub-image has another first brightness value,
    wherein the second non-overlapping portion of the second sub-image has the second brightness value,
    wherein the fourth region and the fifth region have a low brightness value and no image is projected in the fourth region and the fifth region,
    wherein the first brightness value and the another first brightness value are lower than the second brightness value, and the low brightness value is lower than the first brightness value and the another first brightness value.

2. The method for generating the image with uniform brightness according to claim 1, wherein the first overlapping portion and the second overlapping portion each have a distribution of brightness in a linear form.

3. The method for generating the image with uniform brightness according to claim 2, wherein the distribution of brightness comprises a plurality of fixed values.

4. The method for generating the image with uniform brightness according to claim 3, wherein the difference between the plurality of fixed values is less than 10%.

5. The method for generating the image with uniform brightness according to claim 1, wherein the first overlapping portion and the second overlapping portion each have a distribution of brightness in a stepped form.

6. The method for generating the image with uniform brightness according to claim 1, wherein the first overlapping portion and the second overlapping portion each have a distribution of brightness in a non-linear form.

* * * * *